(12) United States Patent
Bernard et al.

(10) Patent No.: US 6,634,605 B2
(45) Date of Patent: Oct. 21, 2003

(54) CABLE DUCT COUPLER

(75) Inventors: William A. Bernard, Darien, IL (US); Charles Vander Velde, Frankfort, IL (US); Dennis J. Waszak, Wheaton, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/323,527

(22) Filed: Dec. 18, 2002

(65) Prior Publication Data

US 2003/0085327 A1 May 8, 2003

Related U.S. Application Data

(63) Continuation of application No. 10/039,325, filed on Oct. 27, 2001, which is a continuation-in-part of application No. 09/585,699, filed on Jun. 1, 2000, now Pat. No. 6,450,458.

(51) Int. Cl.$^7$ .................................................. F16L 3/22
(52) U.S. Cl. ...................... 248/68.1; 403/387; 403/122; 52/11; 52/220.5
(58) Field of Search ................................ 403/387, 300, 403/375, 341, 302, 309, 363, 402, 122; 248/49, 48.1, 68.1; 52/11, 220.5

(56) References Cited

U.S. PATENT DOCUMENTS

| | | | | |
|---|---|---|---|---|
| 1,087,791 A | * | 2/1914 | Leavitt ........................ 405/122 |
| 1,682,840 A | * | 9/1928 | Foerch, Jr. ................... 405/122 |
| 1,862,433 A | * | 6/1932 | Ross ............................. 403/205 |
| 3,042,351 A | * | 7/1962 | Du Bois ........................ 248/49 |
| 3,275,355 A | * | 9/1966 | Endler et al. ................. 403/300 |
| 3,351,699 A | * | 11/1967 | Merckle ................. 174/35 GC |
| 3,841,101 A | * | 10/1974 | Henfrey ....................... 405/122 |
| 3,906,146 A | * | 9/1975 | Taylor ......................... 174/72 A |
| 4,163,572 A | * | 8/1979 | Benscoter ................. 285/284.1 |
| 4,305,236 A | * | 12/1981 | Williams ......................... 52/11 |
| 4,306,109 A | * | 12/1981 | Nattel .......................... 174/51 |
| 4,931,597 A | * | 6/1990 | Kimbrough et al. .......... 174/48 |
| 4,954,015 A | * | 9/1990 | McGowan ................... 405/121 |
| 5,035,092 A | * | 7/1991 | Brant ............................. 52/11 |
| 5,038,528 A | * | 8/1991 | Brant ............................. 52/11 |
| 5,067,678 A | * | 11/1991 | Henneberger et al. ...... 248/68.1 |
| D347,209 S | * | 5/1994 | Henneberger .............. D13/155 |
| 5,316,243 A | * | 5/1994 | Henneberger .............. 248/68.1 |
| 5,391,840 A | * | 2/1995 | Hughes et al. ............. 174/68.3 |
| 5,522,675 A | * | 6/1996 | Gunter ......................... 405/118 |
| 5,735,637 A | * | 4/1998 | Gunter ......................... 405/118 |
| 5,752,781 A | * | 5/1998 | Haataja et al. .............. 403/387 |
| 6,450,458 B1 | * | 9/2002 | Bernard ...................... 248/68.1 |
| 6,523,791 B2 | * | 2/2003 | Bernard et al. ............. 248/68.1 |

* cited by examiner

Primary Examiner—Kimberly Wood
(74) Attorney, Agent, or Firm—Robert A. McCann; Jay A. Saltzman; Christopher S. Clancy

(57) ABSTRACT

A cable duct coupler for coupling a first cable duct section to a second cable duct section without the need for tools, the cable duct coupler comprising a channel portion, a first outer guide element and a second outer guide element, a barb mount extending from at least one of the channel portion and the outer guide elements, and a barb having a body and first and second arms extending from the body, the barb being mounted on the barb mount, wherein at least a portion of the first arm extends at an angle between the first portion of the channel portion and the barb body and at least a portion of the second arm extends at an angle between the second portion of the channel portion and the barb body.

10 Claims, 8 Drawing Sheets

CABLE DUCT COUPLER

RELATED APPLICATION

This application is a continuation, claiming priority to previously filed U.S. patent application Ser. No. 10/039,325, filed Oct. 27, 2001, which is a continuation-in-part application, claiming priority to previously filed U.S. patent application Ser. No. 09/585,699, filed Jun. 1, 2000 now U.S. Pat. No. 6,450,458, the entirety of the previously filed applications being incorporated herein by reference.

BACKGROUND OF THE INVENTION

Field of the Invention

Raceway duct systems have become very popular in recent years to route, protect, and conceal data, voice, video, fiber optic and/or power cabling. Such systems allow custom installation and can be provided within walls or more preferably provided on external surfaces, allowing ready access for reconfiguration, repair, or installation of additional equipment. Such systems may typically include various sections of duct or raceway, including straight sections and various fittings, such as 90° elbow fittings, 45° elbow fittings, T-fittings, four-way intersection (x) fittings, and the like, respective ones of which are affixed together by duct couplers to cumulatively form a duct system.

Due to the increase in number and sophistication of such raceway duct systems, the number of duct couplers being installed in such systems has also increased significantly. Therefore, it is important to have couplers that are easy to install and expensive to manufacture, and that provide relatively high pull-out force to prevent unintended disassembly.

SUMMARY OF THE INVENTION

In one form of the invention, there is provided a cable duct coupler for coupling a first cable duct section to a second cable duct section without the need for tools, the first and second cable duct sections each having an end, the cable duct coupler comprising a channel portion having a first portion generally complementary to the end of the first cable duct section and a second portion generally complementary to the end of the second cable duct section, a first outer guide element generally complementary to the end of the first cable duct section and a second outer guide element generally complementary to the end of the second cable duct section, wherein the end of the first cable duct section is receivable into the coupler between the first portion of the channel portion and the first outer guide element and the end of the second cable duct section is receivable into the coupler between the second portion of the channel portion and the second outer guide element, a barb mount extending from at least one of the channel portion and the outer guide elements, and a barb having a body and first and second arms extending from the body, the barb being mounted on the barb mount, wherein at least a portion of the first arm extends at an angle between the first portion of the channel portion and the barb body and at least a portion of the second arm extends at an angle between the second portion of the channel portion and the barb body, wherein upon insertion of the end of the first cable duct section into the coupler between the first portion of the channel portion and the first outer guide element, the first arm of the barb engages the first cable duct section to significantly resist withdrawal of the first cable duct section, and wherein upon insertion of the end of the second cable duct section into the coupler between the second portion of the channel portion and the second outer guide element, the second arm of the barb engages the second cable duct section to significantly resist withdrawal of the second cable duct section.

In another form of the invention, there is provided a cable duct system comprising a first cable duct section having an end, a second cable duct section having an end, and a cable duct coupler including, a channel portion having a first portion generally complementary to the end of the first cable duct section and a second portion generally complementary to the end of the second cable duct section, a first outer guide element generally complementary to the end of the first cable duct section and a second outer guide element generally complementary to the end of the second cable duct section, wherein the end of the first cable duct section is receivable into the coupler between the first portion of the channel portion and the first outer guide element and the end of the second cable duct section is receivable into the coupler between the second portion of the channel portion and the second outer guide element, a barb mount extending from at least one of the channel portion and the outer guide elements, and a barb having a body and first and second arms extending from the body, the barb being mounted on the barb mount, wherein at least a portion of the first arm extends at an angle between the first portion of the channel portion and the barb body and at least a portion of the second arm extends at an angle between the second portion of the channel portion and the barb body, wherein upon insertion of the end of the first cable duct section into the coupler between the first portion of the channel portion and the first outer guide element, the first arm of the barb engages the first cable duct section to significantly resist withdrawal of the first cable duct section, and wherein upon insertion of the end of the second cable duct section into the coupler between the second portion of the channel portion and the second outer guide element, the second arm of the barb engages the second cable duct section to significantly resist withdrawal of the second cable duct section.

In yet another embodiment of the invention, there is provided a method for assembling a cable duct system, the method comprising providing a first cable duct section having an end, providing a second cable duct section having an end, providing a cable duct coupler having a channel portion with a first portion generally complementary to the end of the first cable duct section and a second portion generally complementary to the end of the second cable duct section, a first outer guide element generally complementary to the end of the first cable duct section and a second outer guide element generally complementary to the end of the second cable duct section, a barb mount extending from at least one of the channel portion and the outer guide elements, and a barb having a body and first and second arms extending from the body, the barb being mounted on the barb mount, wherein at least a portion of the first arm extends at an angle between the first portion of the channel portion and the barb body and at least a portion of the second arm extends at an angle between the second portion of the channel portion and the barb body, inserting the end of the first cable duct section between the first portion of the channel portion and the first outer guide element until the first arm of the barb engages the first cable duct section to significantly resist withdrawal of the first cable duct section, and inserting the end of the second cable duct section between the second portion of the channel portion and the second outer guide element until the second arm of the barb engages the second cable duct section to significantly resist withdrawal of the second cable duct section.

DETAILED DESCRIPTION OF PREFERRED EMBODIMENTS

Figure 1:
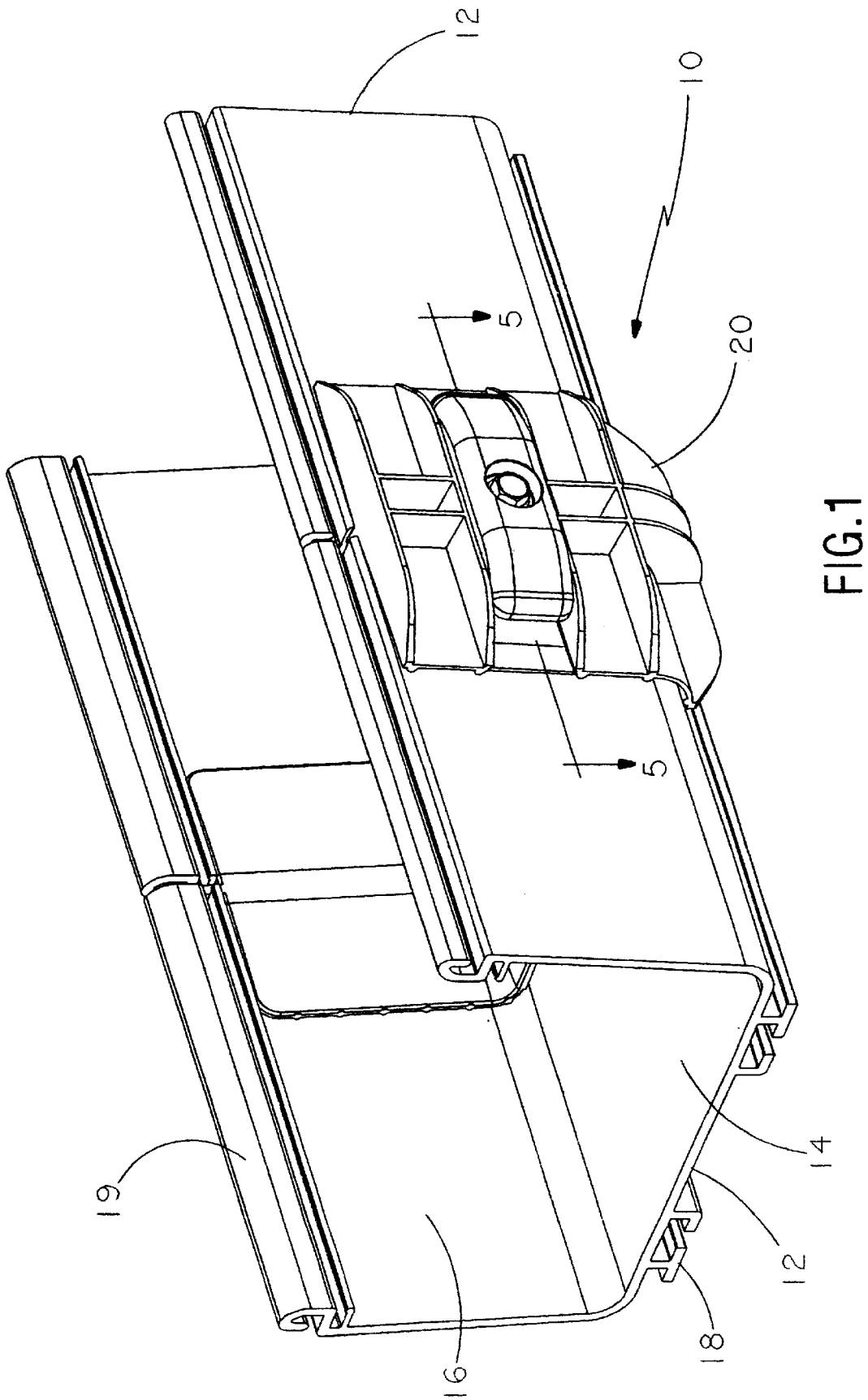
FIG. 1 is a perspective view of a cable duct coupler and cable duct system in accordance with an embodiment of the invention wherein first and second cable duct sections are coupled together by the coupler.

FIG. 1 shows a cable duct system 10 in accordance with an embodiment of the invention, and in particular shows a pair of discrete cable duct sections 12 each having an end 13 (FIG. 4) inserted into and retained by a cable duct coupler 20 in accordance with an embodiment of the invention. As seen, the end of the cable duct section preferably has a U-shape, with a bottom portion 14 and two upwardly extending side portions 16. The bottom portion may preferably include axially extending ribs 18 for strengthening the cable duct section, for facilitating the mounting of the cable duct section onto a floor, wall, bracket, or other supportive structure, and for preferably providing alignment criteria relative to the coupler 20. At or near the distal ends of the side portions 16, there may also preferably be a curved lip 19 or the like for facilitating the attachment of a lid over the cable duct section 12 to substantially enclose the cable duct section and retain one or more cables therein, as is well known in the art. The duct section may also include longitudinal ribs 17 on the outside thereof. The cable duct section is preferably made from a hard plastic or other strong, slightly deformable, dielectric material.

Figure 2:
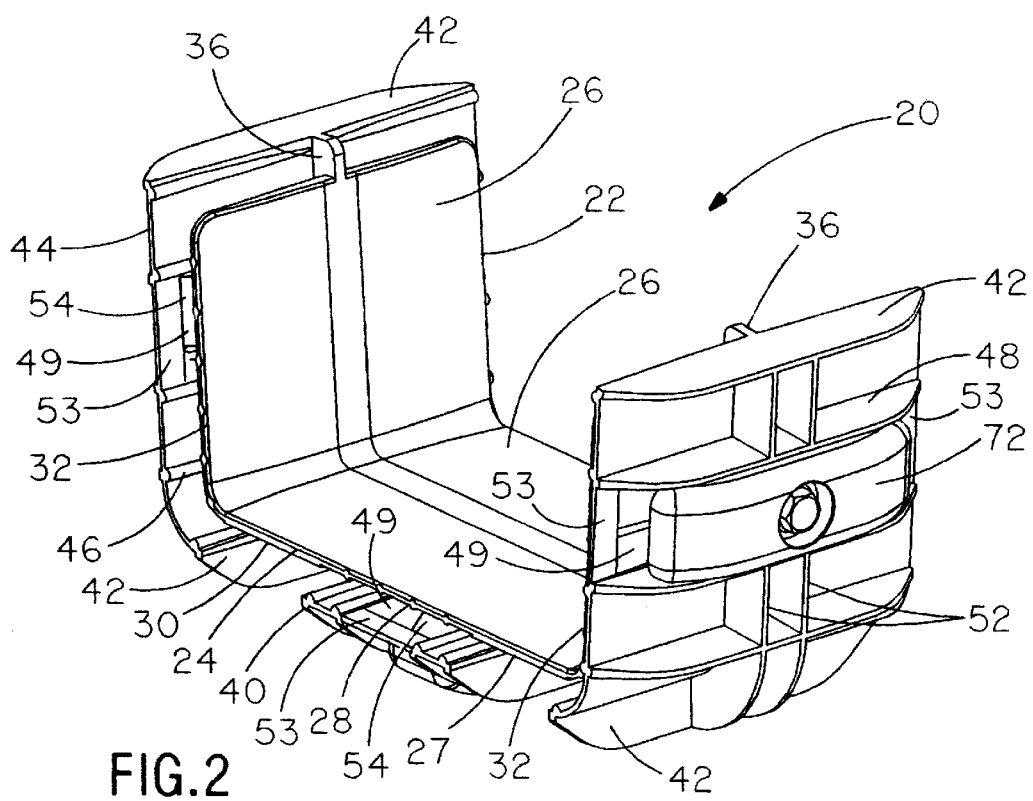
FIG. 2 is a perspective view of the coupler of FIG. 1.
Figure 3:
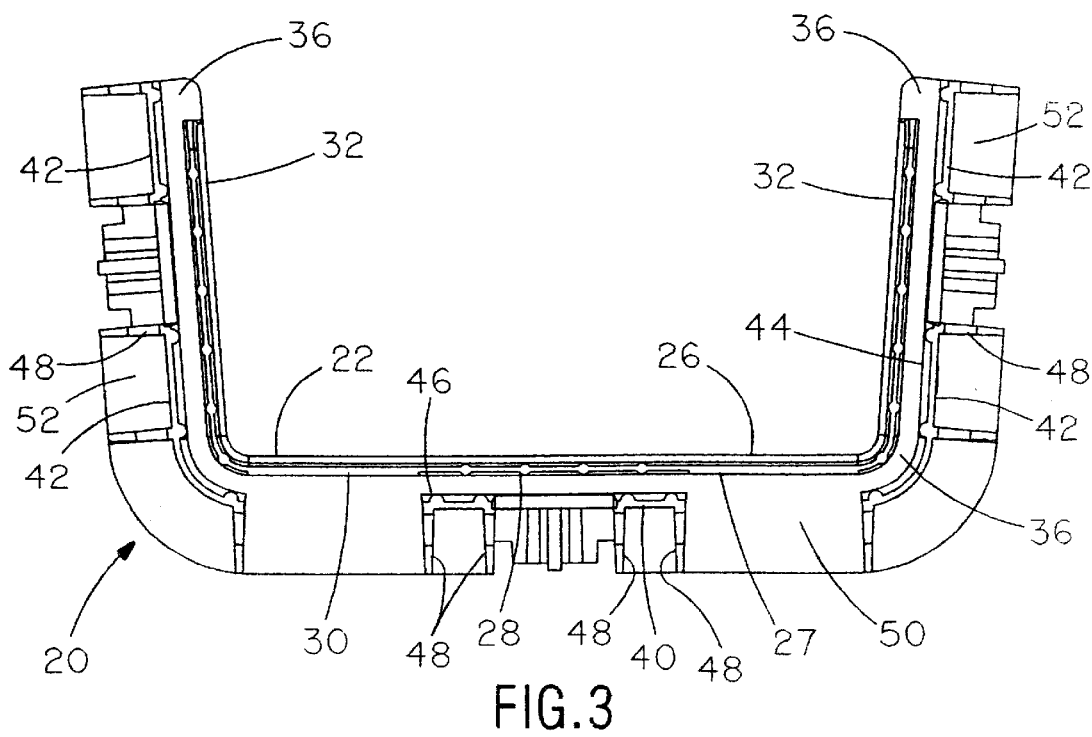
FIG. 3 is a front elevational view of the coupler of FIG. 1.

The coupler 20 is shown in greater detail in FIGS. 2 and 3, with FIG. 2 showing the coupler in perspective and FIG. 3 showing a front elevational view thereof. The coupler 20, as seen previously in FIG. 1, joins two discrete cable duct sections 12, and the coupler has an axial direction generally in accordance with and parallel to the direction in which cables will generally lie as they pass through the coupler, i.e., generally in line with the longitudinal direction of the cable duct sections.

Coupler 20 has a channel portion 22 which defines the cable pathway therethrough as the cable makes its way from one cable duct section to another. In a preferred embodiment, the channel portion includes a bottom portion 30 and two side portions 32 extending somewhat perpendicularly to each end of the bottom portion 30. The side portions 32, in a preferred embodiment, form a slightly obtuse angle (>90°) relative to the bottom portion 30, to open the section and facilitate cable retention and withdrawal. The channel portion 22 has an inner surface 26 including the facing surfaces of the side portions 32 and the upper surface of the bottom portion 30, and an outer surface 27 including the opposite surfaces of the bottom and side portions 30 and 32.

In a preferred embodiment, the coupler includes a rib 36 extending outwardly and generally perpendicularly from the outer surface 27 of the channel portion 22. The rib 36 preferably completely traverses the outer surface 27 of the channel portion 22, dividing it and the entire coupler into two symmetric halves, a first portion 24 for receiving a first cable duct section and a second portion 25 for receiving a second cable duct section. In a preferred embodiment, the rib 36 is centrally disposed along a line of symmetry for the coupler. As seen in FIGS. 2 and 3, the outer surface 27 of the channel portion 22 may preferably include contact ridges 28 for contacting and facilitating the alignment of an end of a cable duct section when inserted into the coupler.

Coupler 20 also includes a number of outer guide elements facilitating the alignment of a duct section end as it is inserted into the coupler. In the illustrated embodiment, the coupler includes a pair of outer guide elements 40 disposed opposite the outer surface 27 of the bottom portion 30 of the channel portion 22, and a pair of outer guide elements 42 opposing the outer surface 27 of each side portion 32 of the channel portion 22. The outer guide elements 40 include guide surfaces 44 and axial web portions 48, with the guide surfaces 44 and axial web portions 48 being supported by a centered transverse web portion 50, all of which extend from the narrow central rib 36 traversing the outer surface 27 of the channel portion 22. The outer guide elements 42 opposite the side portions 32 of the channel portion also include guide surfaces 44 and axial web portions 48, but they are supported by a pair of non-centrally disposed transverse web portions 52 extending outwardly from the corresponding guide surfaces 44. Any or all of the guide surfaces 44 of the respective outer guide elements 40 and 42 may preferably include alignment ridges 46 for contacting and facilitating the alignment of an end of a cable duct section being inserted into the coupler. Additionally, there may be any number of guide elements 40 and 42 within the scope of the invention, and the gaps 49 between adjacent guide elements may, in particular embodiments of the invention, be spanned by a strengthening web 53 to strengthen the coupler generally.

Figure 4:
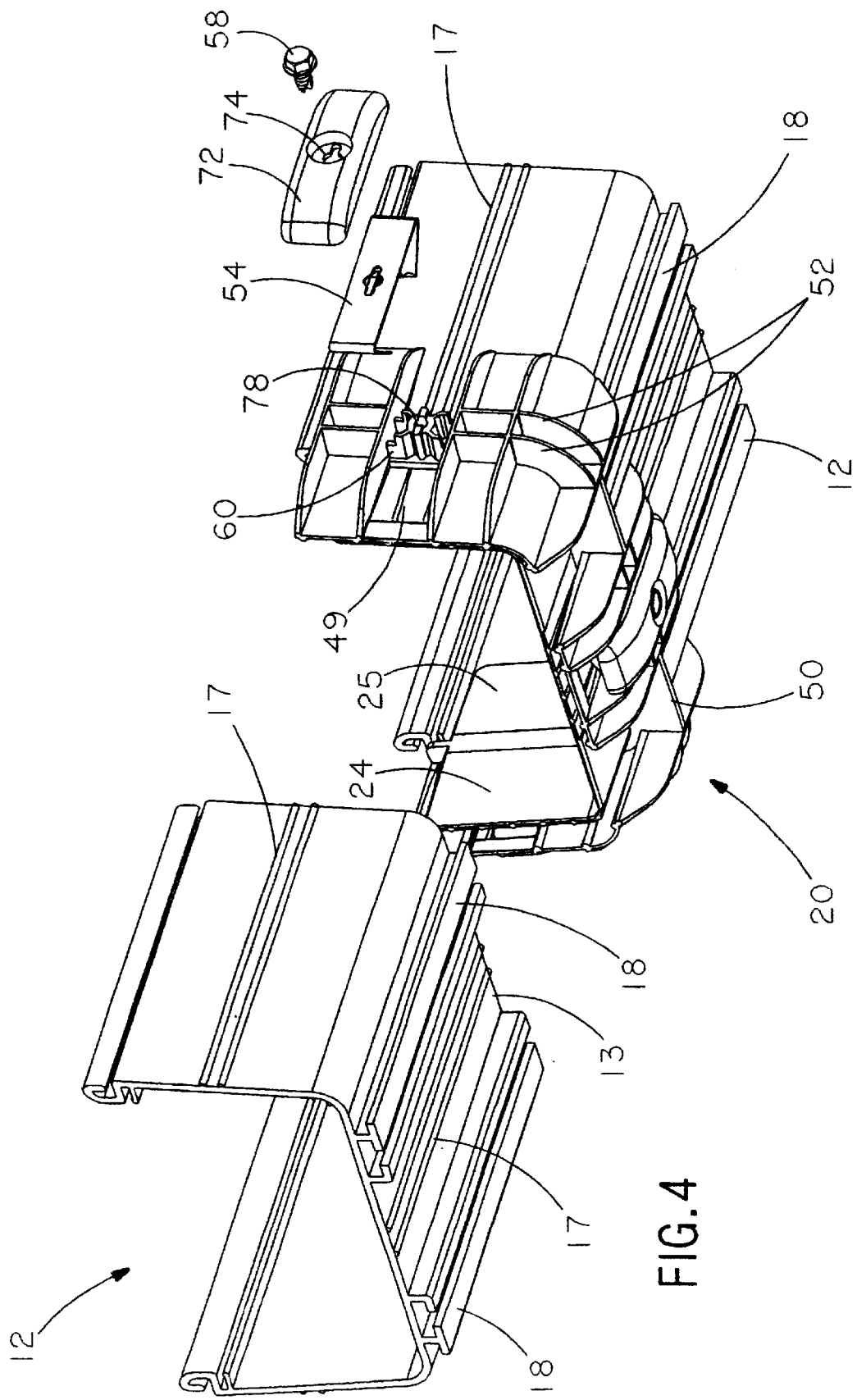
FIG. 4 is a partially exploded perspective view of the duct section coupler of FIG. 1 showing the alignment of an end of the cable duct section with the coupler and the alignment of the barb, cover, and screw to the coupler body.
Figure 5:
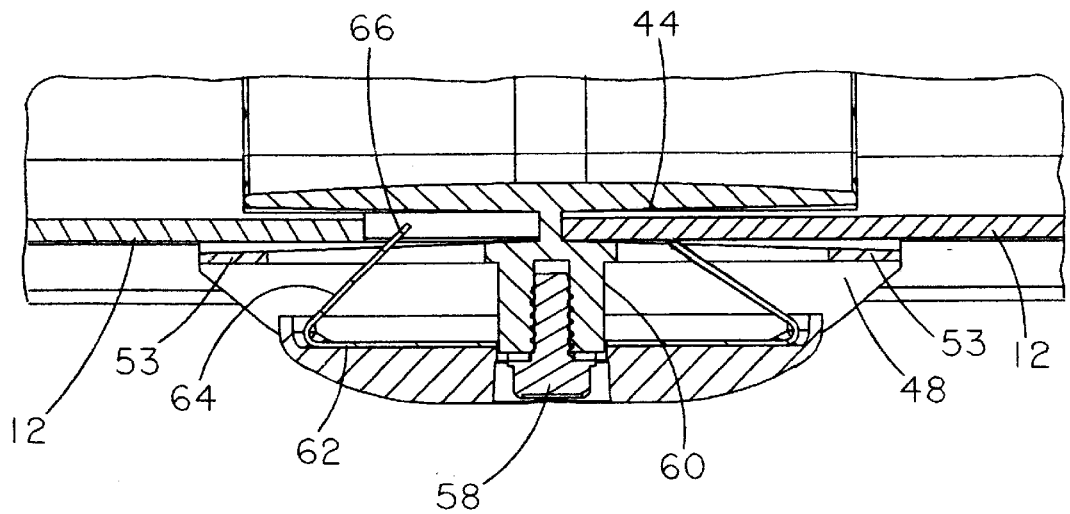
FIG. 5 is a cross-sectional view of the coupler of FIG. 1 showing the barb thereof in detail, the cross-sectional view taken across the line 5—5 in FIG. 1.

In the illustrated embodiment of the invention, and as best seen in FIGS. 2 and 4, between particular outer guide elements, 40 and 42, there are gaps 49. Preferably disposed between transverse web portions 50 and 52 corresponding to adjacent outer guide elements 40 and 42, and preferably disposed on or substantially on the central rib 36, there is a barb mount 60 for receiving a fastener therein. In the illustrated embodiment, the barb mount supports a barb 54 thereon and has an internally threaded aperture 78 therein. As seen in FIGS. 4 and 5, the barb 54 includes a pair of arms 64 bent back relative to a body portion 62 at an angle greater than 90° so that the arms angle towards each other. The barb body 62 is mountable upon the barb mount 60 and retainable thereon by an externally threaded screw 58 or other fastener which penetrates a hole 56 in the barb and is directed into the internally threaded screw aperture 78 in the barb mount 60. Thus, the barbs 54 are mounted in gaps 49 between particular outer guide elements 40 and 42. In a preferred embodiment of the invention, the barb may have serrated edges 66 at the distal ends of its arms 64. The serrated edges permit the barb arms to more reliably engage inserted cable duct sections so as to resist withdrawal of the section from the coupler. In particular, the serrated edge may "bite" or "dig" into the material of the duct section 12, such as extruded plastic.

Figure 6:
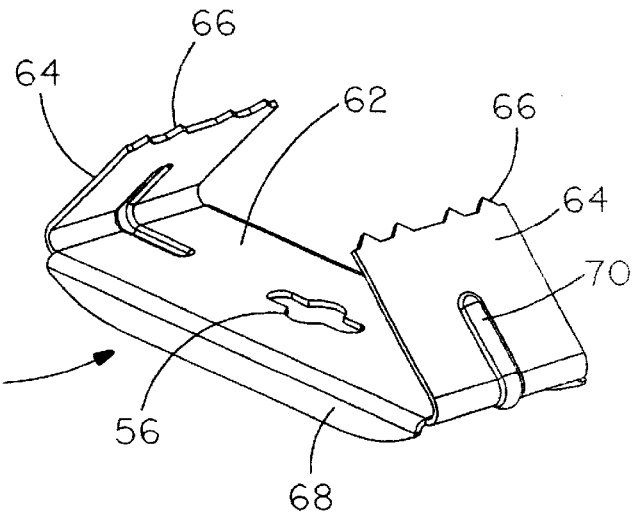
FIG. 6 is a perspective view of an alternative embodiment of the barb.
Figure 7:
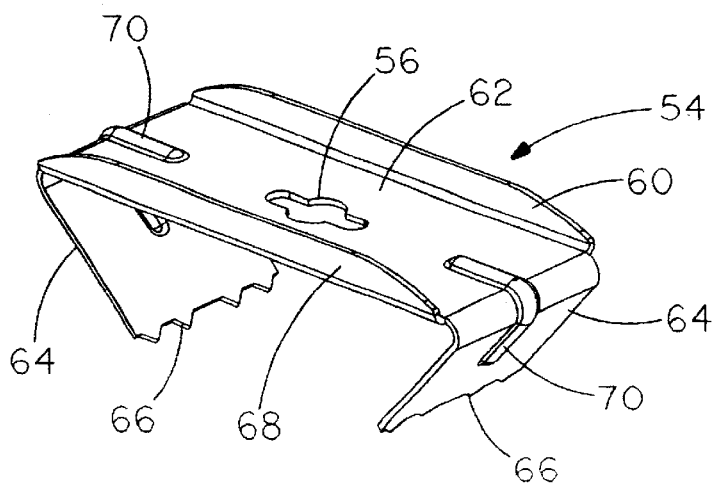
FIG. 7 is a reverse perspective view of the barb of FIG. 6.

Also in a preferred embodiment of the invention, and as best seen in FIGS. 6 and 7, the barb body 62 may have one or more flanges 68 running lengthwise along the edges thereof: Such flanges render the barb body 62 less prone to bending/deflection during withdrawal of a duct section from the coupler and thereby increase the minimum withdrawal force of the coupler. Also in a preferred embodiment of the invention, portions of the barb arms 64 and portions of the barb body 62 include one or more ribs 70 to strengthen the barb and make it less vulnerable to having the barb arm 64 deflected relative to the barb body 62, especially during duct section withdrawal. Also in a preferred embodiment of the invention, the barb cover 72 may include a hole centrally located therein so that it may be retained over the barb body by the screw 58. Covers 72 enhances the aesthetic appearance of the coupler by hiding the metal barbs 54 and, in some embodiments, may provide contact support for the barbs 54 when withdrawal force is applied to a cable duct section inserted into the coupler.

When the end 13 of a cable duct section 12 is to be inserted into a coupler 20 in the illustrated embodiment of the invention, the U-shaped profile of the end 13 is inserted to generally circumscribe the outer surface 27 of the channel portion 22 of the coupler. The various guide surfaces 44 of the outer guide elements 40 and 42 may initially contact the end 13 of the cable duct section 12 and facilitate alignment of the cable duct section into the coupler. In particular, contact ridges 46 of the guide surfaces 44 assist in the alignment upon insertion, as do the contact ridges 28 on the outer surface 27 of the channel portion 22. The cable duct section's strengthening ribs 18 are aligned to fit into gaps between the outer guide elements 40, 42.

While the end 13 of the cable duct section 12 approaches its fully inserted position adjacent to the central rib 36, it encounters barb arms 64 angled generally in the direction of the insertion. Because the end 13 lacks sufficient clearance, it will contact one of each barb's arms 64 upon insertion. The barb arms 64 will deflect slightly toward their respective barb bodies 62 to permit the end 13 to pass thereunder without offering substantial resistance as the end continues toward the central rib 36. The serrated edges 66 of the barb arms 64 will not significantly bite into the extruded plastic end 13 during insertion due to the angle of the barb arms 64. Once the end 13 comes flush with the central rib 36, the insertion is completed.

When a withdrawal force is applied to the cable duct section 12, the end 13 of the cable duct section begins to and nominally slides away from the central rib 36, but upon such nominal movement in the withdrawal direction, the serrated edges 66 of the barb arms 64 bitingly engage and dig in to the extruded plastic of the duct section 12. Longitudinal ribs 17 on the exterior of the duct section are optionally provided to enhance the magnitude of engagement of the barb arms 64 therewith. The withdrawal forces are thereby countered by the resistance of the barb arms 64 to open. Thus, in order to withdraw the cable duct section, enough withdrawal force must be applied to either significantly deform the arms of the barbs or to permit the serrated edges 66 of the barb arms 64 to lose their biting grip thereon and thereby score the cable duct section 12 as it is withdrawn from the coupler. In a preferred embodiment of the invention, the duct section slides under the barb arm, with possible socring, and the barb arms are not permanently deformed when a withdrawal force exceeding the minimum withdrawal force is applied to the duct section. Avoiding damage to the barb arms permits the coupler to be reused.

In the embodiments of the invention including a barb cover, such as barb cover 72, the cover may prevent or limit deflection of the barb body in a direction away from the cable duct section so as to support the magnitude of biting engagement between the serrated edge 66 and the extruded duct section. In the embodiments shown in FIGS. 6 and 7, the flange(s) 68 and the rib(s) 70 provide the support without the presence of a barb cover.

Figure 8:
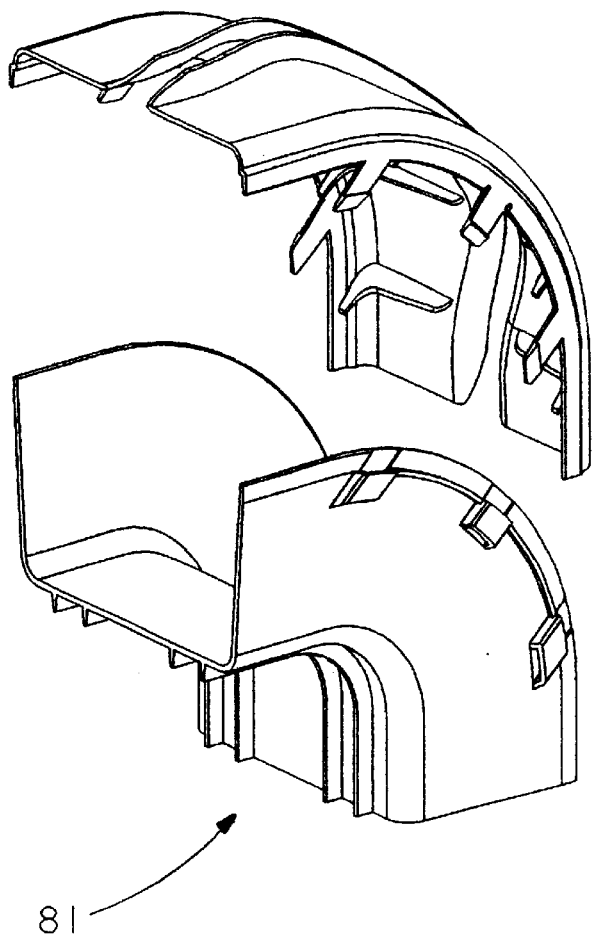
FIGS. 8–15 show various cable duct system fittings, with lids, that may be coupled to each other or to a cable duct section by a coupler in accordance with the invention.
Figure 9:
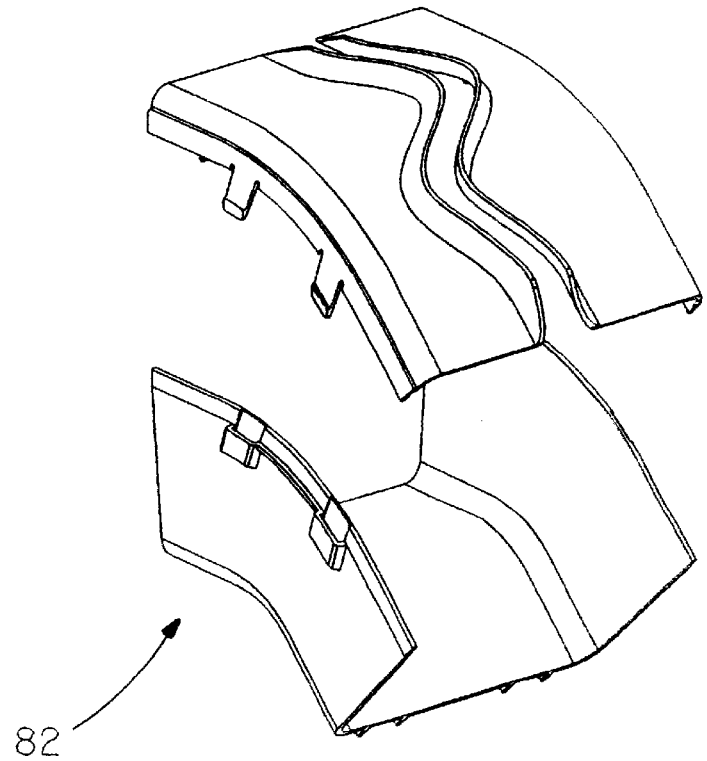
Figure 10:
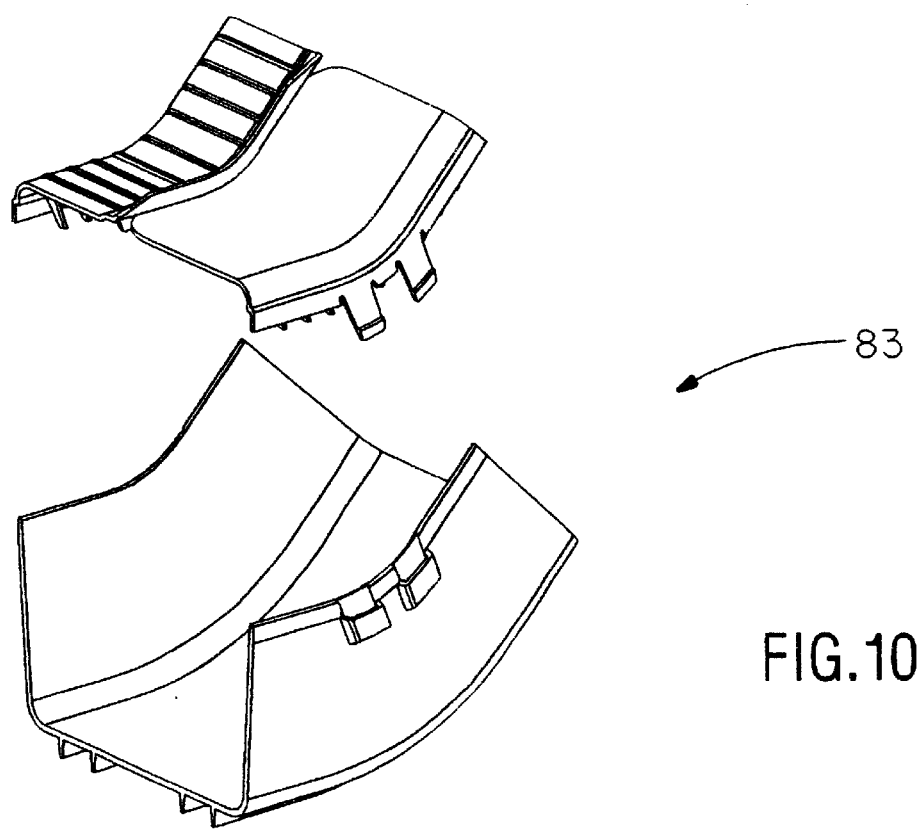
Figure 11:
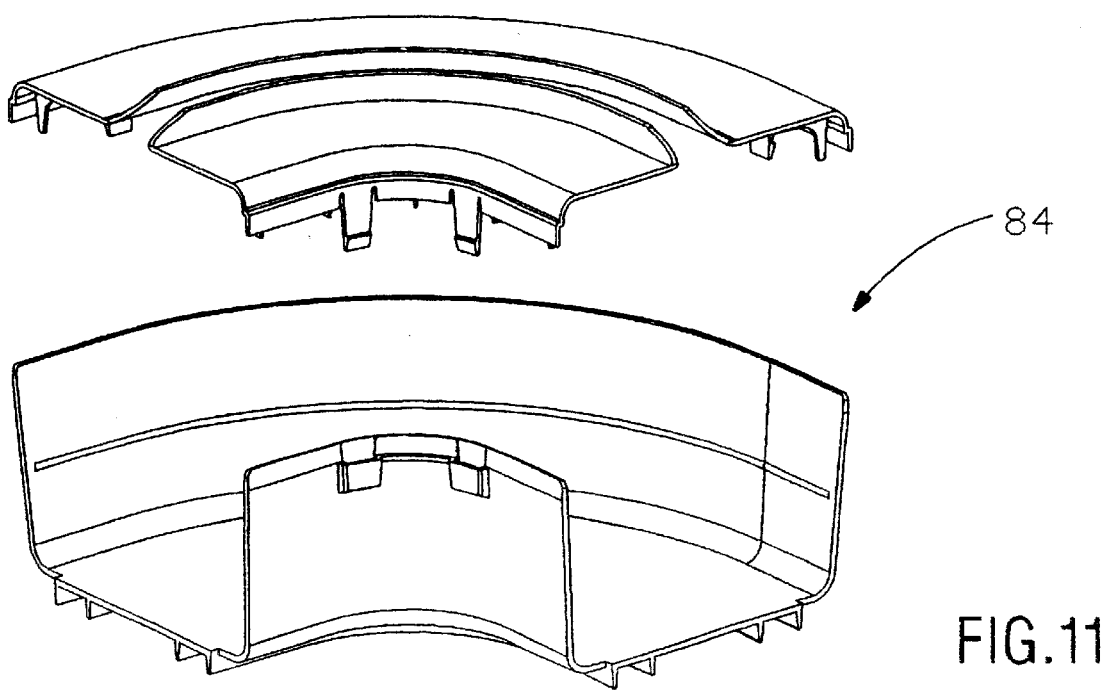
Figure 12:
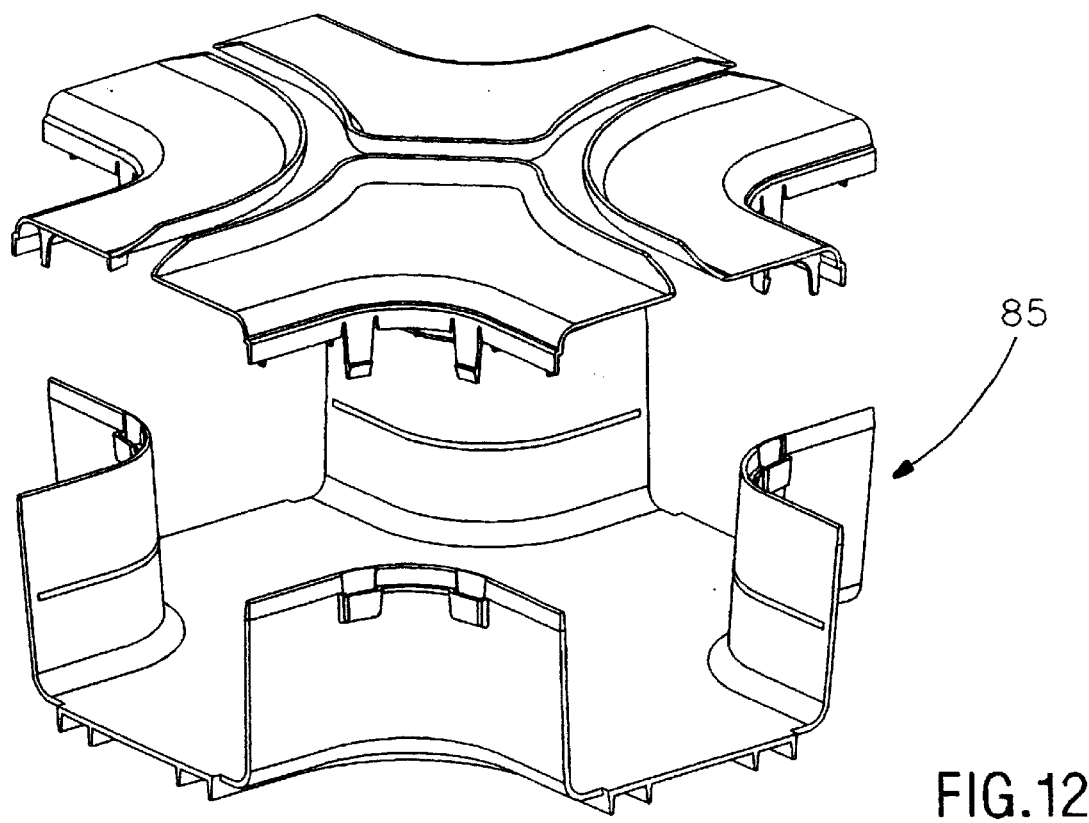
Figure 13:
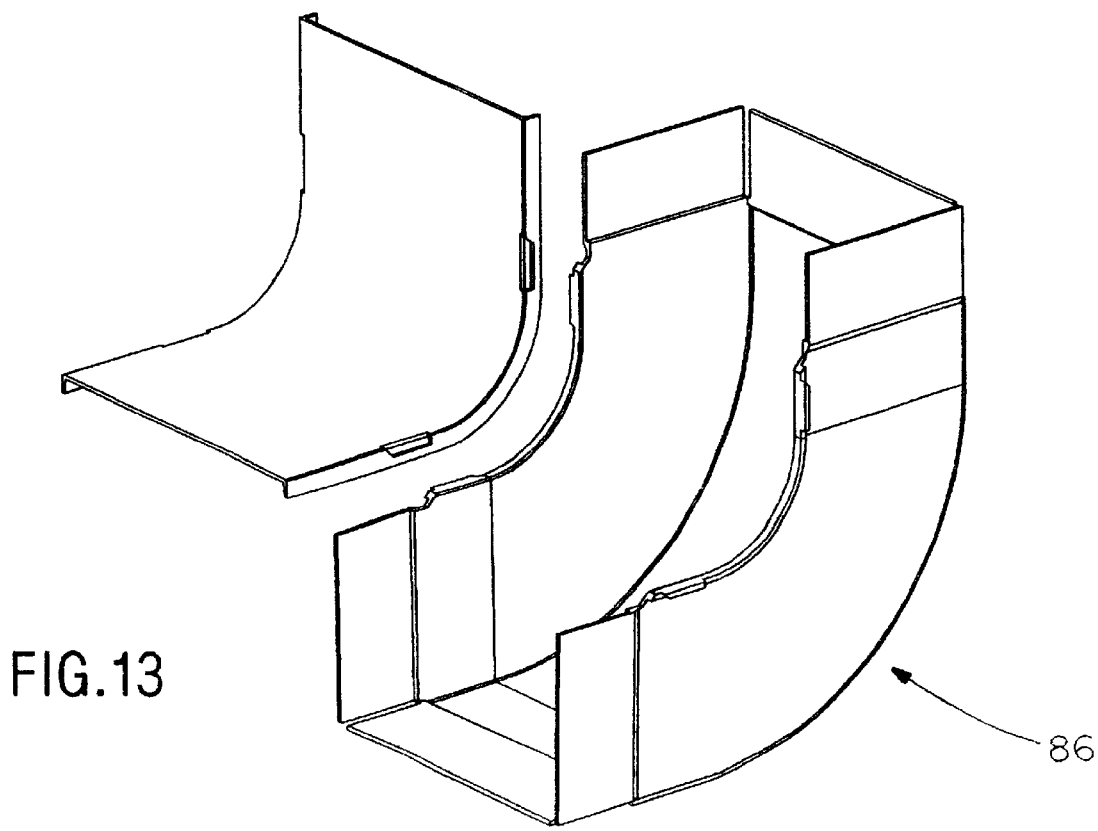
Figure 14:
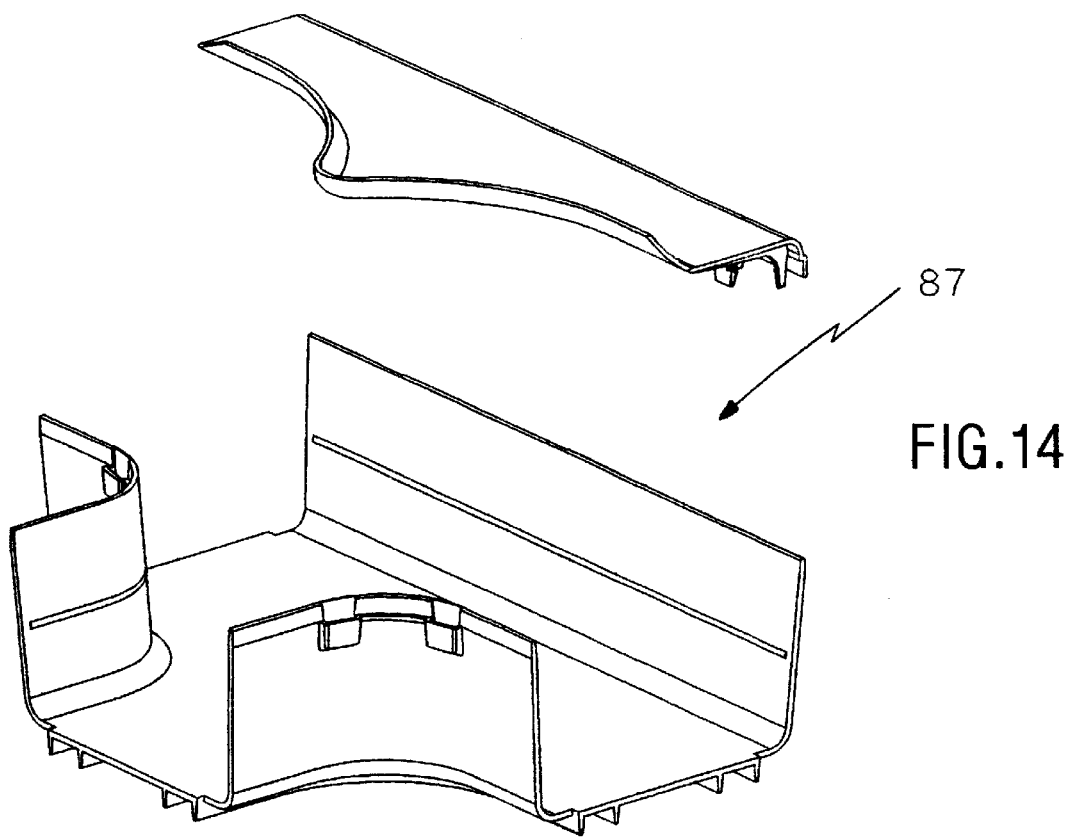
Figure 15:
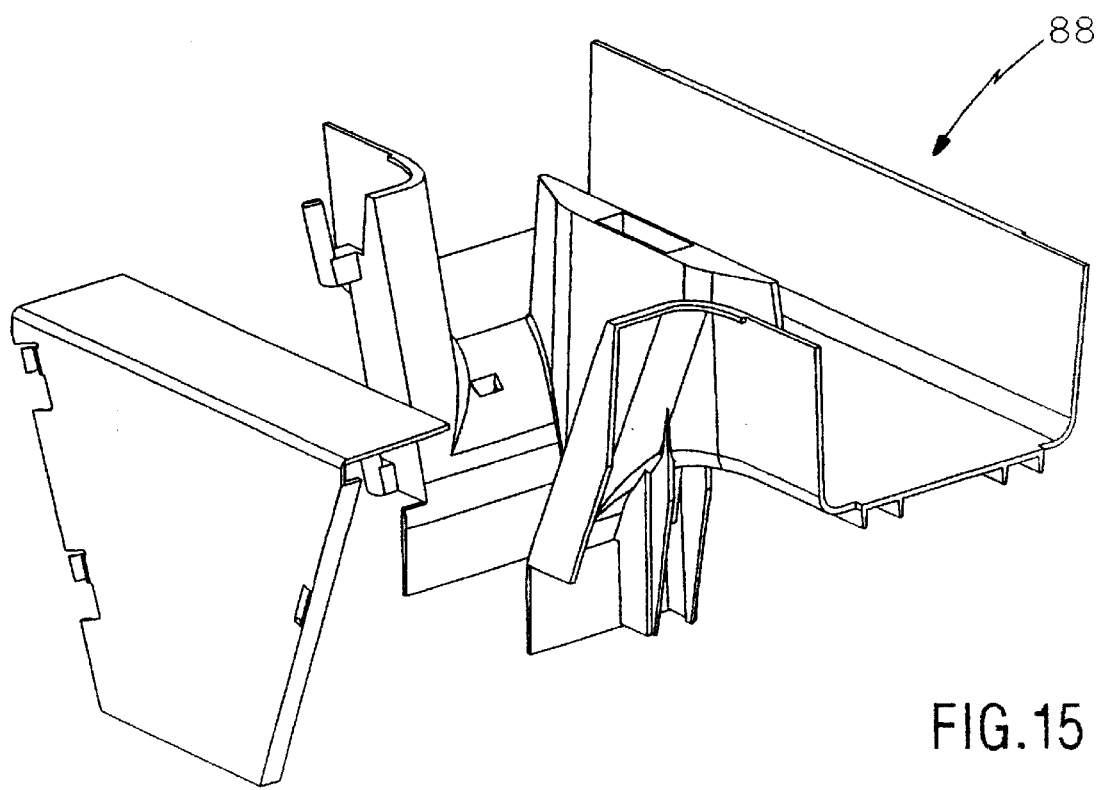

FIGS. 8–15 show various cable duct system fittings, with lids, that may be coupled to each other or to a straight cable duct section by a coupler in accordance with the invention. FIG. 8 shows an outside vertical right angle fitting for routing cable between a horizontal orientation and a vertical orientation. FIG. 9, similarly, shows an outside vertical 45° fitting. FIG. 10 shows an inside vertical 45° fitting. FIG. 11 shows an inside vertical right angle fitting. FIG. 12 shows a four-way cross fitting. FIG. 13 shows an inside vertical right angle fitting. FIG. 14 shows a horizontal Tee fitting. FIG. 15 shows a vertical Tee fitting. These fittings are exemplary and in no way limit the scope of the application of the inventive cable duct system and coupler.

The disclosed invention provides an improved cable duct coupler and cable duct system. It should be noted that the above-described and illustrated embodiments and preferred embodiments of the invention are not an exhaustive listing of the forms such a coupler and system in accordance with the invention might take; rather, they serve as exemplary and illustrative of embodiments of the invention as presently understood. By way of example, and without limitation, a non-U-shaped coupler and correspondingly shaped duct sections are contemplated to be within the scope of the invention. Similarly, while the illustrated embodiment includes covers over each of the barbs in the coupler, embodiments having no covers are also contemplated by the invention. Many other forms of the invention are believed to exist. The invention is defined by the following claims.

What is claimed is:

1. A method for disassembling a cable duct system, said method comprising the following steps:

providing first and second cable duct sections, each having an end, and a cable duct coupler having a channel portion with a first portion generally complementary to said end of said first cable duct section and a second portion generally complementary to said end of said second cable duct section, a first outer guide element generally complementary to said end of said first cable duct section and a second outer guide element generally complementary to said end of said second cable duct section, a barb mount extending from at least one of said channel portion and said outer guide elements, and a barb having a body and first and second arms extending from said body, said barb being mounted on said barb mount by a releasable fastener, wherein at least a portion of said first arm extends at an angle between said first portion of said channel portion and said barb body and at least a portion of said second arm extends at an angle between said second portion of said channel portion and said barb body, wherein said first cable duct section is retained within said coupler by said first arm of said barb bitingly engaging said first cable duct section and said second cable duct section is retained within said coupler by said second arm of said barb bitingly engaging said second cable duct section;

releasing said releasable fastener to release said barb from said barb mount and thereby release said biting engagement of said first arm of said barb with said first cable duct section and said biting engagement of said second arm of said barb with said second cable duct section;

withdrawing said first cable duct section from said cable duct coupler; and withdrawing said second cable duct section from said cable duct coupler.

2. A method in accordance with claim 1 wherein said fastener is helically threaded such that it may be released by axial rotation.

3. A method in accordance with claim 1 wherein at least one of said cable duct sections is a straight trough section.

4. A method in accordance with claim 1 wherein at least one of said cable duct sections is a fitting.

5. A method in accordance with claim 1 wherein said step of releasing said releasable fastener does not completely detach said fastener from said barb mount.

6. A method of disassembling and reassembling a cable duct system, said method comprising the following steps:

providing first and second cable duct sections, each having an end, and a cable duct coupler having a channel portion with a first portion generally complementary to said end of said first cable duct section and a second portion generally complementary to said end of said second cable duct section, a first outer guide element generally complementary to said end of said first cable duct section and a second outer guide element generally complementary to said end of said second cable duct section, a barb mount extending from at least one of said channel portion and said outer guide elements, and a barb having a body and first and second arms extending from said body, said barb being mounted on said barb mount by a releasable fastener, wherein at least a portion of said first arm extends at an angle between said first portion of said channel portion and said barb body and at least a portion of said second arm extends at an angle between said second portion of said channel portion and said barb body, wherein said first cable duct section is retained within said coupler by said first arm of said barb bitingly engaging said first cable duct section and said second cable duct section is retained within said coupler by said second arm of said barb bitingly engaging said second cable duct section;

releasing said releasable fastener to release said barb from said barb mount and thereby release said biting engagement of said first arm of said barb with said first cable duct section and said biting engagement of said second arm of said barb with said second cable duct section;

withdrawing said first cable duct section from said cable duct coupler;

withdrawing said second cable duct section from said cable duct coupler;

refastening said releasable fastener to remount said barb on said barb mount;

inserting said end of said first cable duct section between said first portion of said channel portion and said first outer guide element until said first arm of said barb engages said first cable duct section to significantly resist withdrawal of said first cable duct section from said cable duct coupler; and inserting said end of said second cable duct section between said second portion of said channel portion and said second outer guide element until said second arm of said barb engages said second cable duct section to significantly resist withdrawal of said second cable duct section from said cable duct coupler.

7. A method in accordance with claim 6 wherein said fastener is helically threaded such that it may be released by axial rotation.

8. A method in accordance with claim 6 wherein at least one of said cable duct sections is a straight trough section.

9. A method in accordance with claim 6 wherein at least one of said cable duct sections is a fitting.

10. A method in accordance with claim 6 wherein said step of releasing said releasable fastener does not completely detach said fastener from said barb mount.

* * * * *